June 14, 1932.    J. H. V. FINNEY    1,863,155
SAFETY DEVICE
Filed May 28, 1929
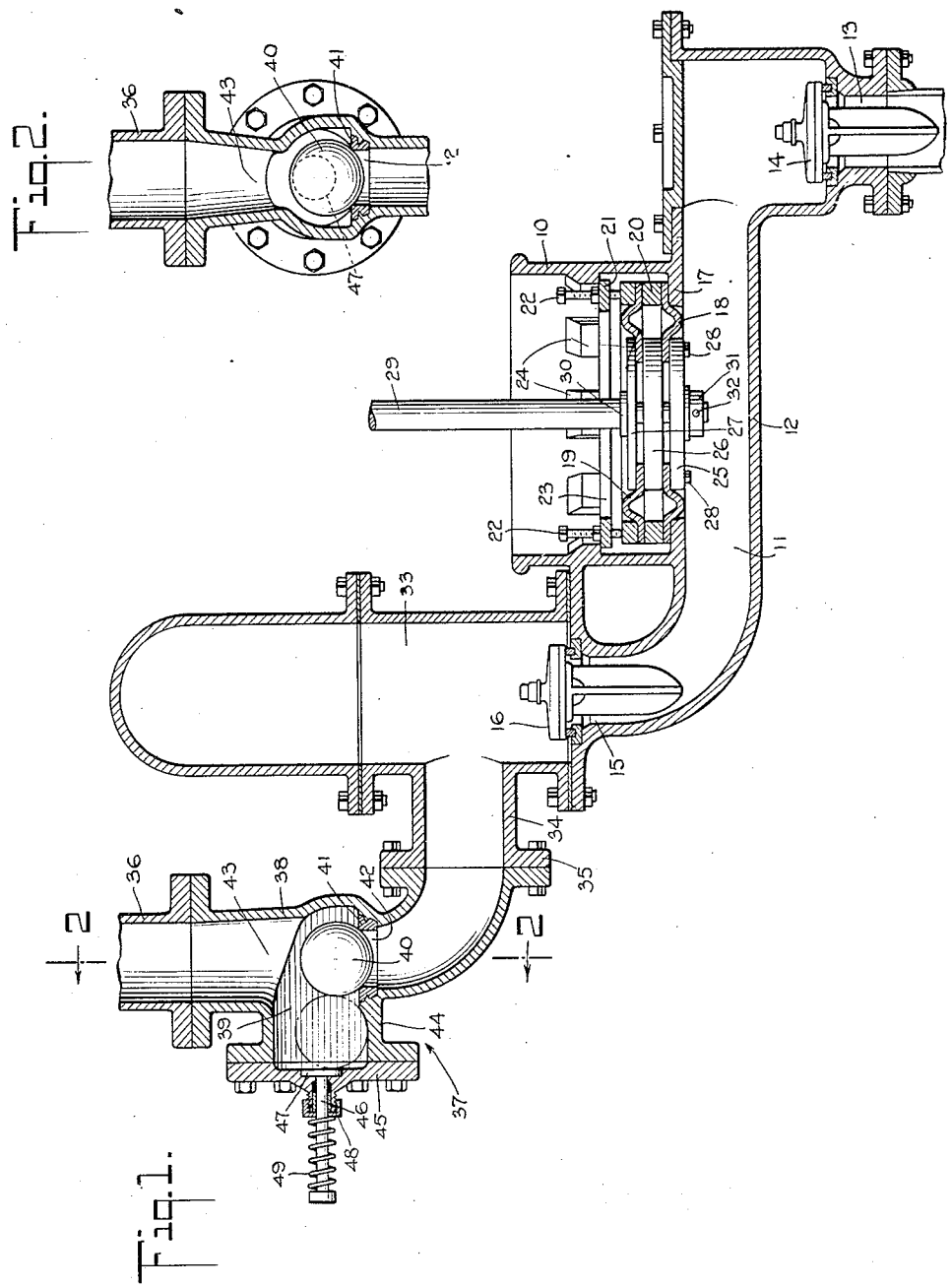
INVENTOR
John H. V. Finney
BY
ATTORNEY Patented June 14, 1932

1,863,155

UNITED STATES PATENT OFFICE

JOHN H. V. FINNEY, OF DENVER, COLORADO, ASSIGNOR, BY MESNE ASSIGNMENTS, TO THE DORR COMPANY, INC., OF NEW YORK, N. Y., A CORPORATION OF DELAWARE

SAFETY DEVICE

Application filed May 28, 1929. Serial No. 366,580.

This invention relates to valve apparatus adapted for use in controlling back flow in pressure lines and more particularly in connection with diaphragm pumps or pressure pumps.

In the event of replacement of or repairs to pumps or other pressure producing apparatus it is often necessary to prevent rearward flow of fluid through the pressure lines. Such prevention may be effected in each case by means of an ordinary manually operated valve which should be closed before beginning such replacement or repairing and opened upon completion of such work to permit the liquid to flow through the pressure line upon starting the pump or other apparatus. Unless such manually operated valve is opened before or substantially at the time of starting the pump, an abnormal pressure will be built up and either the pump will be stalled or the apparatus will be broken.

Particularly in handling liquids containing abrasive materials in suspension it is advisable to avoid the use of pistons fitting lightly in pump cylinders inasmuch as such cylinders would be worn or abraded rapidly. To avoid such abrasive action use has long been made of suction diaphragm pumps and more recently of pressure diaphragm pumps, to which this invention is particularly applicable. Two forms of such pressure diaphragm pumps are disclosed in the patent to E. C. Reybold, Jr., et al., No. 1,610,473 December 14, 1926.

In pressure diaphragm pumps there is probably, in ordinary use, a greater tendency than in ordinary piston pumps to breakage such as rupture of the diaphragms, thus requiring more frequent closing of the pressure lines and increasing the risk of damage from failure to open the pressure lines when operations are to be resumed. In addition to the danger of breakage due to failure to open the valves in the pressure lines, such valves usually have the additional disadvantage of obstructing to some extent the flow of fluid through the pressure lines.

The main object of the present invention is to provide in a pressure line a device which normally is ineffective and offers substantially no obstruction to the flow of liquid therethrough but may be rendered effective to prevent backflow while permitting forward flow and being restored to ineffective condition thereby.

Further objects and advantages of the invention will be apparent upon consideration of the following description and the accompanying drawing, in which Fig. 1 is a vertical longitudinal sectional view of one form of apparatus embodying the present invention; and Fig. 2 is a vertical section taken along the line 2—2 of Fig. 1.

The objects of the invention are in general accomplished by locating in the pressure line a device having a substantially unobstructed passage permitting the liquid to flow in both directions during normal operation but including an element which may be manually shifted into operative position to prevent backflow, so arranged and constructed that the member will be shifted into permanent inoperative position when the pump starts up.

The obstructing member is preferably adapted to be held in operative position, preventing backflow, and to be shifted into inoperative position, solely by the pressure of the liquid in the line.

In the preferred embodiment shown the device is of a type similar to that employed in check valves, such as employ balls or flaps; and the ball type is illustrated. The outlet opening and the inlet, which passes through the valve seat, are in alignment to provide unobstructed flow. A recess is arranged laterally of the seat in which a ball is normally located and retained regardless of the direction of flow through the line. Manually operable means is provided whereby the ball may be projected into operative position where back pressure in the line will force it on the seat. Means is also provided whereby the pumping pressure will automatically shift the ball back into the recess when the pump starts up without manual operation or any manual readjustment of parts, thereby eliminating entirely the possibility of obstruction to the liquid during pumping.

Referring to the drawing, 10 designates a pump cylinder communicating at one end with a combined suction and pressure chamber 11, both formed in a casing 12. At one end of the chamber 11 there is an inlet 13 controlled by a suitable valve 14 and at the other end there is an outlet 15 controlled by a suitable valve 16. The pump casing is provided with a flange 17 to support annular diaphragms 18 and 19 at their peripheries where the diaphragms are maintained in spaced relation by a spacing ring 20. Clamping of the diaphragms to the flange 17 is effected by means of a clamping ring 21 resting upon the upper diaphragm 19 and forced downwardly by screws 22 in a pressure ring 23 provided with notches in its periphery which permit it to pass over lugs 24 at the inner surface of the pump cylinder and by a slight rotation to be held down by said lugs against the upward thrust of the screws.

The inner edges of the diaphragms 18 and 19 are held between plates or disks 25, 26 and 27 which are locked together by suitable fastening devices 28, bolts or screws for example, and the reduced lower end of a plunger rod 29 is passed through said plates which are clamped against a shoulder 30 at the upper end of said reduced portion by means including a nut 31 which may be held in position by a cotter pin 32. As illustrated in Fig. 1, the two diaphragms are arranged in opposed relation so that the concave side of each is effective in the direction of the pressure which it is to overcome. Preferably the space between the diaphragms is filled with water or other substantially incompressible liquid so as to transmit pressure readily from either diaphragm to the other.

Upon downward movement of the plunger rod 29 from its mid position, as illustrated in Fig. 1, pressure is exerted to force any liquid or fluid in the chamber 11 through the outlet past the valve 16, and upon reversal of such movement suction is created and liquid is drawn into the chamber 11 past the valve 14. The pump may thus be used both for suction and pressure. The outlet 15 opens into an air dome 33 and the fluid passing through the outlet 15 is forced out through a tubular discharge 34 having a suitable flange 35 at its outer end, and is conducted away through a pressure line or pipe 36.

In the event of replacing the pump or repairing the same it is desirable to shut off the pressure line from the pump to avoid draining the liquid from the pressure line when the pump is removed or taken down. This may be done by using an ordinary manually operable valve, but in such a case there is danger of failure to open the valve thereby causing breakage when the pump is started; or by using a check valve in which case there would be substantial obstruction to the normal flow through the discharge pressure line, and no means for normally permitting backflow, as for draining the lines for periodic cleaning, an operation often necessary in handling certain fluids.

According to the illustrative embodiment of the present invention, these objections are met by the use of a device 37 having a tubular portion 38 attached at one end to the flange 35 and at the other end to the pressure line 36. At an intermediate point of the tubular portion or member 38 there is provided a valve chamber 39 of greater width than the passage in the lower part of the member and having an offset portion extending to one side to provide space to receive a valve member 40, preferably a ball, adapted to cooperate with an annular valve seat 41 at the inlet 42 to said chamber, and the floor of said offset portion or extension is lower than the portion at the edge of the valve seat thereby providing a recess or depression in which the ball 40 normally rests. The outlet 43 is directly above the inlet to provide a direct line of flow through the chamber and is made narrow to prevent passage of the ball therethrough while of sufficient length to make it of substantially the same cross section as the inlet. Preferably the outlet is in the form of an oval. At the outlet the top of the chamber is so inclined as to constitute guiding means to direct the ball 40 to its ineffective position, shown at the left in dot and dash lines, whenever it is forced from the valve seat by liquid passing through the inlet 42.

The offset portion of the chamber 39 is located in a tubular projection 44 which is open at its outer end and the chamber is closed at such outer end by means of a member or plate 45 secured to said projection in any suitable manner. When the flow from the pump has stopped, the ball must be displaced from its dot and dash line position in Fig. 1 so that it will cooperate with the valve seat 41 and prevent back flow through the pressure line 36. Such displacement may be effected by means of a plunger 46 passing through a central bore in the member 45 and having an enlarged head 47 limiting the outward movement of the plunger and normally resting in a depression in the inner face of said member 45. The plunger passes through a packing box or gland 48 which serves to prevent leakage along the plunger and the plunger is urged to its extreme outward position by means of a spring 49 surrounding the stem of the plunger and interposed between the packing box and the enlarged outer end of the plunger.

By pressing in on the plunger 46 the enlarged head thereof will act to displace the ball 40 from its ineffective position and in case of failure of the pressure creating means or pump, the ball will cooperate with the valve seat and check back flow. On the other hand, if liquid is being supplied from the pump to the pressure line the ball will be returned to its ineffective position as soon as released by the plunger. Furthermore in case the ball 40 is resting on the valve seat and acting to prevent back flow, and forward flow from the pump is initiated the ball will be transferred to its ineffective position and will offer no resistance to the flow of liquid.

Various changes may be made in the construction and arrangement of parts without departing from the true spirit and scope of the invention.

I claim:

1. A valve for a pressure line comprising a valve casing having an inlet, an outlet, and a horizontal valve-seat surrounding the inlet; a ball for said valve seat and displaceable therefrom by fluid pressure, a horizontal ball-retaining depression located laterally of said valve-seat and adjacent thereto in said valve casing for holding said ball when not upon its valve-seat, means integral with said casing for normally retaining the ball in said depression, and manually operable means for displacing the ball from its depression and returning it to the valve-seat.

2. A valve for a pressure line comprising a valve casing having an inlet, an outlet, and a horizontal valve-seat surrounding the inlet; a ball for said valve-seat displaceable therefrom by fluid pressure, a horizontal ball-retaining depression located laterally of said valve seat and adjacent thereto in said valve casing for holding said ball when not upon its valve-seat, rim means between the valve seat and the depression for normally retaining the ball in the depression, and manually operable means for displacing the ball from its depression and returning it to its valve-seat.

In testimony whereof I affix my signature.

JOHN H. V. FINNEY.